UNITED STATES PATENT OFFICE.

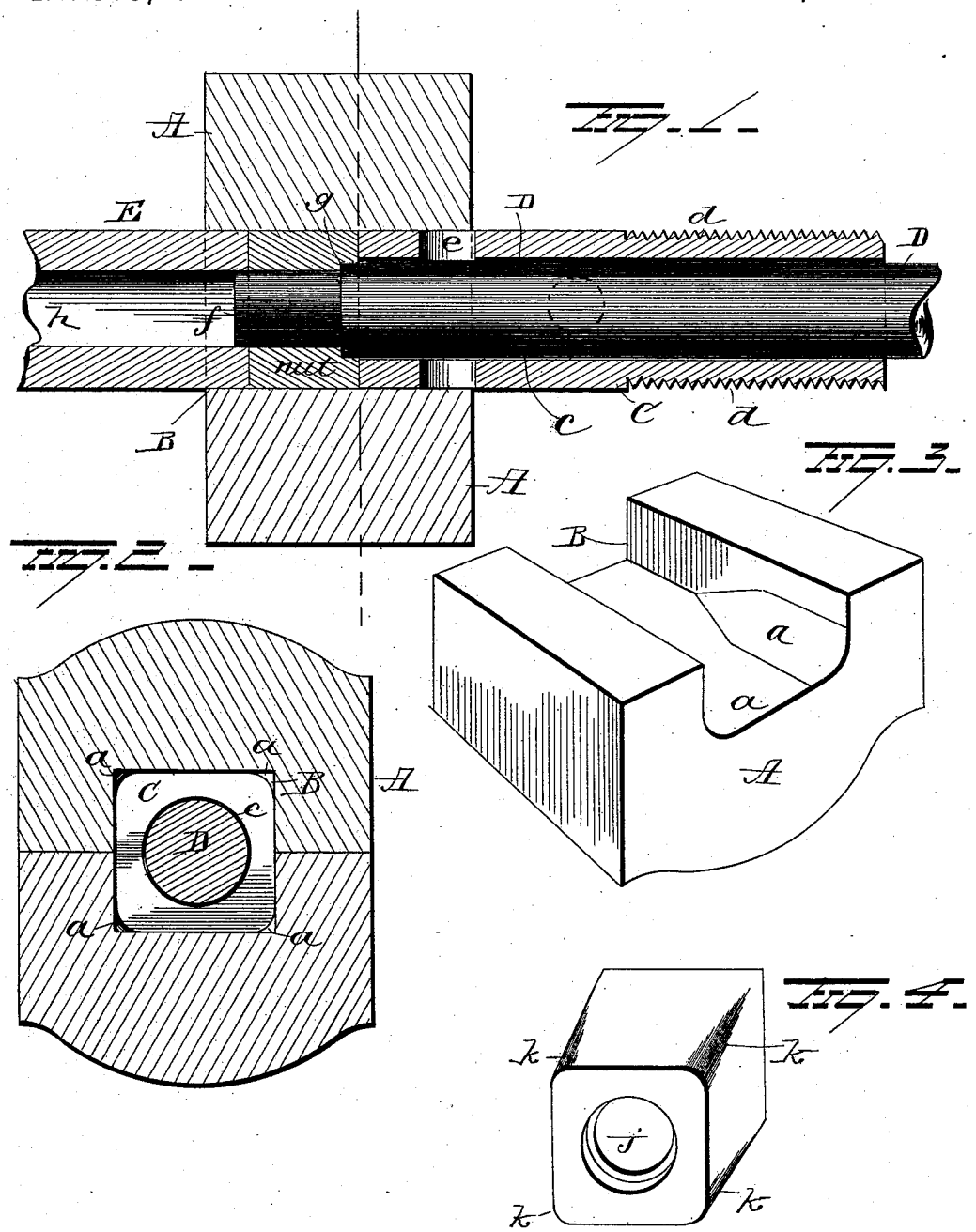

JAMES H. STERNBERGH AND PHILIP H. STERNBERGH, OF READING, PENNSYLVANIA.

DIE FOR MAKING NUTS.

SPECIFICATION forming part of Letters Patent No. 393,792, dated December 4, 1888.

Application filed October 30, 1888. Serial No. 289,507. (No model.)

*To all whom it may concern:*

Be it known that we, JAMES H. STERNBERGH and PHILIP H. STERNBERGH, of Reading, in the county of Berks and State of Pennsylvania, have invented certain new and useful Improvements in Dies or Tools for Making Nuts; and we do hereby declare the following to be a full, clear, and exact description of the invention, such as will enable others skilled in the art to which it appertains to make and use the same.

Our invention relates to an improvement in dies or tools for the manufacture of nuts.

The object is to provide means for the manipulation and manufacture of nuts, whereby simplicity and effectiveness of operation are combined with a resulting small expense.

With this end in view our invention consists in certain features of construction and combinations of parts, as will be hereinafter fully described, and pointed out in the claims.

In the accompanying drawings, Figure 1 is a longitudinal section through the die-box, blank, die, and punches. Fig. 2 is a transverse section through the die-box. Fig. 3 shows parts separated, and Fig. 4 is a view of the finished nut.

A represents a die-box, which may be in a single piece or composed of two or more sections, with an angular opening, B, through its center, preferably square or hexagonal, to receive the blank and give it the required exterior formation. The corners of this opening are rounded, as illustrated, by means of concaved tapering fillets $a$, which extend part way through the opening integral with the walls of the box. A crowning-die, C, having a bore, $c$, has an exterior shape at one end to correspond with the rounded portion of opening B, made so by the fillets, while the other end is in the shape of a screw-threaded tap, $d$, the threads of which engage threads in a crosshead, (not shown,) and the holes $e$ are designed for the reception of a key or tool whereby this crowning-die is screwed backward or forward to give it proper adjustment. This crowning-die is adapted to enter one end of the die-box, and through its bore a piercing-punch, D, is arranged to have a reciprocating movement. Said piercing-punch is provided with a restricted end, $f$, which constitutes a plunger for driving out the core of the blank, the shoulder $g$, formed by the restricted portion, performing a function to be referred to in the operation.

E represents a cut-off punch. It is preferably the shape of the opening B, in order to enter the latter to drive the blank home, and has a hole, $h$, of a size to receive the plunger $f$.

In the operation of making the nuts a bar of iron is heated to a welding heat, and when placed before the opening B in the die-box A the cut-off punch E severs a blank from the end of the bar and forces it into the die-box a sufficient distance to form the chamfered edges $k$ by its contact with the fillets $a$ within the die-box. While in this position the blank is pressed against the crowning-die C, and at the same time the piercing-punch D, passing through the crowning-die, punches the core out of the nut into the bore of cut-off punch E. Then the piercer withdraws, the cut-off backs out, and the crowning-die moves forward, forcing the punched nut out of the die-box, allowing it to fall into an iron bucket beneath. This operation is repeated as often as a nut is formed. Now a glance at the completed nut will show the rounded tapering or chamfered corners $k$, as well as an annular recess, $j$, at one end, formed by the shoulder $g$ of the piercing-punch. These two features constitute the novelties in the article, the former to admit of the nut being turned in limited spaces, while the latter is for the purpose of inclosing and protecting the bolt-threads from the rubbing and pounding action while in service, thus insuring good threads to tighten the nut when the joint becomes loose from stretch of the bolt or wear of the bearing parts.

Having fully described our invention, what we claim as new, and desire to secure by Letters Patent, is—

1. A die-box having fillets in its corners, said fillets extending a portion of the depth of the die-box, substantially as set forth.

2. A die-box having fillets in its corners, said fillets being made concaved and tapering and extending a portion of the depth of the said die-box, substantially as set forth.

3. The combination of a die-box having filleted corners, a crowning-punch to fit in said box, a punch for forcing material in the die-box, and a piercing-punch for producing an opening in the nut, substantially as set forth.

4. The combination of a die-box having filleted corners, a punch for forcing material in said die-box, and a piercing-punch for producing an opening in the nut, said piercing-punch being provided with a shoulder, whereby a recess is produced in the nut of a diameter greater than that of the opening through the nut, substantially as set forth.

In testimony whereof we have signed this specification in the presence of two subscribing witnesses.

JAMES H. STERNBERGH.
PHILIP H. STERNBERGH.

Witnesses:
H. M. M. RICHARDS,
A. I. WRIGHT.